United States Patent
Le Rouzic et al.

(10) Patent No.: US 9,059,885 B2
(45) Date of Patent: Jun. 16, 2015

(54) METHOD OF MANAGING A USER TERMINAL IN A TELECOMMUNICATIONS NETWORK, AND AN ASSOCIATED DEVICE

(75) Inventors: Jean-Claude Le Rouzic, Trebeurden (FR); Antoine Mouquet, Courbevoie (FR); José Doree, Lannion (FR); Lionel Morand, Malakoff (FR)

(73) Assignee: France Telecom, Paris (FR)

( * ) Notice: Subject to any disclaimer, the term of this patent is extended or adjusted under 35 U.S.C. 154(b) by 212 days.

(21) Appl. No.: 13/123,167

(22) PCT Filed: Oct. 5, 2009

(86) PCT No.: PCT/FR2009/051889
§ 371 (c)(1),
(2), (4) Date: Apr. 7, 2011

(87) PCT Pub. No.: WO2010/040938
PCT Pub. Date: Apr. 15, 2010

(65) Prior Publication Data
US 2011/0230190 A1  Sep. 22, 2011

(30) Foreign Application Priority Data
Oct. 7, 2008  (FR) ..................................... 08 56796

(51) Int. Cl.
*H04W 4/00* (2009.01)
*H04L 29/12* (2006.01)
(Continued)

(52) U.S. Cl.
CPC ...... *H04L 29/12188* (2013.01); *H04L 61/1588* (2013.01); *H04W 8/02* (2013.01); *H04L 65/1006* (2013.01)

(58) Field of Classification Search
CPC ..... H04W 88/06; H04W 48/18; H04W 76/02; H04W 76/00; H04L 65/1016; H04L 65/1069; H04L 65/1006
USPC ................. 455/435.1; 370/352; 709/227–228
See application file for complete search history.

(56) References Cited

U.S. PATENT DOCUMENTS

| | | | |
|---|---|---|---|
| 8,265,090 B2 * | 9/2012 | Cai et al. | 370/410 |
| 2004/0081159 A1 * | 4/2004 | Pan et al. | 370/395.2 |

(Continued)

FOREIGN PATENT DOCUMENTS

| DE | 102006026929 A1 | 12/2007 | |
|---|---|---|---|
| WO | 2008046303 A1 | 4/2008 | |
| WO | WO2008046303 | * 4/2008 | H04Q 7/32 |

OTHER PUBLICATIONS

English translation of the Written Opinion dated May 31, 2011 for corresponding International Application No. PCT/FR2009/051889, filed Oct. 5, 2009.

(Continued)

*Primary Examiner* — Nathan Mitchell
(74) *Attorney, Agent, or Firm* — David D. Brush; Westman, Champlin & Koehler, P.A.

(57) ABSTRACT

A method and apparatus are provided for managing a terminal of a user of a telecommunications network. The terminal is connected to the telecommunications network via at least one access network. The method includes a step, executed on receiving a registration request including an address of record of the user, an address of contact of the terminal, and an access network type of the terminal, of storing in a database an association between the address of record of the user, the access network type of the terminal, and the address of contact of the terminal.

12 Claims, 4 Drawing Sheets

(51) Int. Cl.
*H04W 8/02* (2009.01)
*H04L 29/06* (2006.01)

(56) References Cited

U.S. PATENT DOCUMENTS

2005/0114513 A1* 5/2005 Dorenbosch et al. ......... 709/227
2009/0129388 A1* 5/2009 Akhtar et al. ................. 370/392
2009/0190533 A1* 7/2009 Zhu et al. ...................... 370/328

OTHER PUBLICATIONS

International Search Report dated Feb. 24, 2010 for corresponding International Application No. PCT/FR2009/051889, filed Oct. 5, 2009.
Written Opinion dated Feb. 24, 2010 for corresponding International Application No. PCT/FR2009/051889, filed Oct. 5, 2009.
Qualcomm: "S2-061474: Use Cases for Multiple Registrations" Internet Citation, Jan. 1, 2007, XP002450226, URL: http://www.3gpp.org.

* cited by examiner

METHOD OF MANAGING A USER TERMINAL IN A TELECOMMUNICATIONS NETWORK, AND AN ASSOCIATED DEVICE

CROSS-REFERENCE TO RELATED APPLICATIONS

This Application is a Section 371 National Stage Application of International Application No. PCT/FR2009/051889, filed Oct. 5, 2009 and published as WO 2010/040938 on Apr. 15, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is telecommunications, more particularly a telecommunications network that a user terminal may access via a plurality of access networks.

BACKGROUND OF THE DISCLOSURE

In an IP telecommunications network, in which exchanges of signaling are based on the Session Initiation Protocol (SIP), for example, a user is identified by an address of record (AOR). This user may use this AOR on one or more terminal equipments, which behave as SIP user agents (UA) adapted to receive signaling messages sent to the AOR of the user. To be contactable at their AOR, a user must register their terminal in the telecommunications network beforehand, by initiating a registration procedure with a registration server or Registrar. Such a procedure has the effect of associating with the AOR of the user one or more addresses of contact (AOC) to which a signaling message, for example a call set-up request message, may be directly routed.

Such an association is stored in an SIP Location service database or server. Such a server is interrogated by a proxy server on reception of a signaling request sent to the AOR of the user with a view to obtaining the address or addresses of contact associated with that AOR.

There are at least three situations in which an AOR may be associated with a plurality of AOCs:

- when the user uses their AOR simultaneously on a plurality of terminal equipments; for example, the user has a fixed terminal and a mobile terminal from which they have registered in the telecommunications network with the same address of record of the type alice@orange.com;
- when the user uses a dual-mode or multi-mode terminal, i.e. a terminal that can be connected simultaneously to a plurality of access networks to the telecommunications network; for example, the user has a dual-mode terminal adapted to be connected to a Wi-Fi access network and to a UMTS (Universal Mobile Telecommunications System) access network simultaneously; and
- a combination of the previous two situations.

Such situations cause problems with routing a signaling request sent to the AOR of the user. According to the document RFC (Request For Comment) 3261 of the IETF (Internet Engineering Task Force) standardization organization, the proxy server is responsible for routing such a signaling request to one or more addresses of contact that form a target set. In particular, if the target set contains a plurality of addresses, the proxy server sends the signaling request to each of those targets in parallel or sequentially. This is referred to as forking.

There are prior art methods of limiting or controlling forking. In particular, the IETF document RFC 3841 teaches how to enable a proxy server to eliminate some AOC from a target set in order to adapt to the preferences of a calling user and to the capabilities of the terminal of a called user.

A drawback of such a mechanism is not allowing a choice of a particular type of access network to which to route signaling request.

SUMMARY

An aspect of the present disclosure relates to a method of managing a user terminal in a telecommunications network, said terminal being connected to at least one access network to said network.

On reception of a registration request containing an address of record of the user, at least one address of contact and at least one access network type of the terminal, the method executes a step of storing at least one association between the address of record of the user, an address of contact of the terminal and an access network type in a database.

Thus an embodiment of the invention allows an address of contact of a terminal of the user corresponding to a particular type of access network to the network to be obtained from an address of record of a user in the telecommunications network.

According to one aspect of the disclosure, the management method includes the following preliminary steps:

- obtaining a list of addresses of contact stored in the network for the address of record of the user; and
- deducing from the list obtained at least one address of contact corresponding to the access network type of the request.

This aspect has the advantage of allowing an entity downstream of the telecommunications network entity hosting the registrar function to obtain the information necessary to store the associations as called for by the an embodiment of the invention. Such an entity, for example an application server responsible for the execution of a service to which the user subscribes, may receive the address of contact of the registrar entity itself rather than the address of contact assigned to the terminal by the registrar entity.

According to another aspect of an embodiment of the invention, following said registration step and on reception of a session set-up request going to said address of record of the user, said method executes the following steps:

- obtaining at least one stored association including said address of record, an access network type, and an address of contact of the terminal in an access network;
- obtaining an access network type by means of which to access the called terminal; and
- selecting an address of contact to which to route said request in the stored associations as a function of the access network type.

The method has the advantage of allowing, on reception of a call set-up request sent to the address of record of the user, selection as a function of an access network type of at least one address of contact from those available in the stored associations. Thus the signaling request may be routed only to the address or addresses of contact associated with the requested access network type.

According to a first variant, the access network type is obtained from the session set-up request.

An access network type is specified in the session set-up request. The calling user terminal may advantageously insert the access network type by means of which it wishes to set up communication with the called terminal when it knows the access network types by which the called terminal is connected. Alternatively, such insertion may be effected by another equipment in the signaling stream, for example an entity of the telecommunications network, for example an application server.

According to a second variant, the access network type is obtained by selection as a function of predetermined criteria in said at least one stored association.

The access network type is selected as a function of predetermined criteria, for example rules defined by the telecommunications carrier. Such rules may take into account different parameters such as the load supported by each access network type or the type of service requested, for example.

An embodiment of the invention also relates to a user terminal management device in a telecommunications network. Such a device is adapted to implement the management method that has just been described.

Such a device may be hosted in a telecommunications network equipment such as a proxy server or an application server. Alternatively, it may be external to those equipments.

Thus in a correlated way an embodiment of the invention further relates to a proxy server in a telecommunications network, including means for receiving a registration request including an address of record of a user, an access network type and an address of contact of a terminal by which said user is connected to at least one access network to said network, and means for receiving a session set-up request going to the address of record of said user in the telecommunications network and a device for managing said user terminal.

In the prior art, such a server may implement a registrar function and a session set-up request processor function. According to an embodiment of the invention, such a server is adapted to select at least one address of contact to which to route the request as a function of the requested access network type.

In a correlated way, an embodiment of the invention further relates to an application server in a telecommunications network including means for receiving a registration request including an address of record of a user and an access network type of a terminal by which said user is connected to at least one access network to said network, and means for receiving a session set-up request going to the address of record of said user in the telecommunications network and a device for managing said user terminal.

In the prior art, such an application server is invoked to execute a service to which a user of the telecommunications network subscribes. According to an embodiment of the invention, it is adapted to select at least one address of contact to which to route the request as a function of an access network type. One advantage of this is that this server knows rules predetermined by the network carrier for the execution of the requested service and can therefore take those rules into account when making this selection.

An embodiment of the invention further relates to a method of sending a session set-up request in a telecommunications network to an address of record of a user, including a step of inserting an access network type representing an access network through which to contact the called user.

Such a method may advantageously be implemented by a session set-up request transmission device of an embodiment of the invention including means for inserting into the session set-up request an access network type representing an access network through which to contact the called user, said request being processed by a user terminal management device.

The transmission device may be hosted in a telecommunications network equipment adapted to exchange signaling messages with a user terminal.

In a correlated way, an embodiment of the invention further relates to equipment adapted to exchange signaling messages with a terminal of a user connected to a telecommunications network via at least one access network to said network and including the device for sending a session set-up request.

According to one aspect of an embodiment of the invention, said equipment is a user terminal connected to the telecommunications network. Such a terminal knows a type of access network by which a terminal of the user that they wish to call is connected and indicates it in the request. An advantage of this is that the calling user or their terminal is able to choose by which type of access network to contact the other party as a function of the session that the user wishes to initiate with them.

According to another aspect of an embodiment of the invention, said equipment is an application server of the telecommunications network. If the terminal has no knowledge of an access network type available to a terminal of the user that they wish to call, another equipment in the call request signaling stream is able to insert such information instead. An application server of the telecommunications network advantageously knows a set-up context for this session and is thus able to take into account elements of that context to select an appropriate access network type.

In one particular implementation, the steps of the management and transmission methods that have just been described are determined by computer program instructions.

Consequently, an embodiment of the invention further provides a computer program on an information medium, this program being adapted to be executed in a user terminal management device or more generally in a computer and including instructions adapted to execute the steps of a management method as described above.

Consequently, an embodiment of the invention further provides a computer program on an information medium, this program being adapted to be executed in a transmission device or more generally in a computer and including instructions adapted to execute the steps of a transmission method as described above.

These programs may use any programming language and take the form of source code, object code, or a code intermediate between source code and object code, such as a partially-compiled form, or any other desirable form.

An embodiment of the invention is also directed to a computer-readable information medium containing instructions of a computer program as referred to above.

The information medium may be any non-transitory entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of an embodiment of the invention may in particular be downloaded over an Internet-type network.

Alternatively, the information medium may be an integrated circuit, for example a hardware element in which one or the other of the programs is incorporated, the circuit being adapted to execute one or the other of the methods in question or to be used in its execution.

BRIEF DESCRIPTION OF THE DRAWINGS

Other advantages and features become more clearly apparent on reading the following description of one particular implementation of the invention given by way of illustrative and non-limiting example only, and from the appended drawings, in which.

DETAILED DESCRIPTION OF ILLUSTRATIVE EMBODIMENTS

The general principle of an embodiment of the invention is based on the storage of associations that include an address of record of a user, a type of access network for which a terminal of the user has been registered with the telecommunications network, and an address of contact at which it is possible to contact the terminal via that type of access network.

When a user has been registered with the network via one or more user terminals connected to a plurality of access networks, the network stores as many of these associations as there are registrations that were effected using the same address of record, each association including a specific access network type and a specific address of contact.

Figure 1:
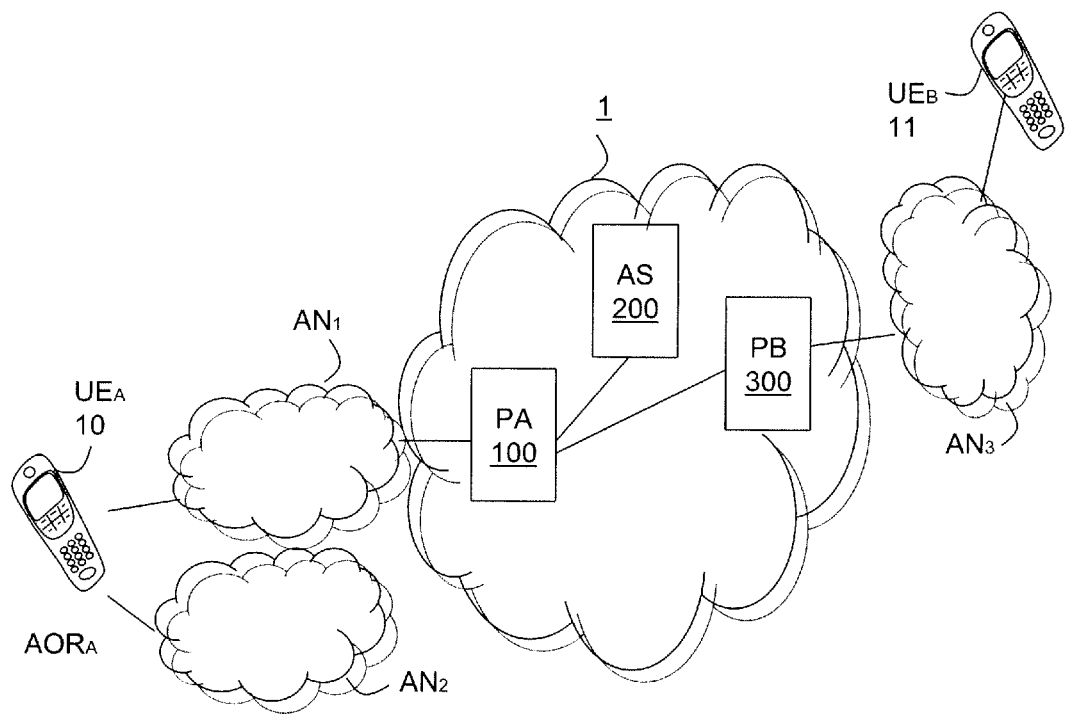
FIG. 1 is a diagram showing a user terminal connected to a telecommunications network implementing an embodiment of the invention.

Referring to FIG. 1, consider a user terminal $UE_A$ 10 that is connected to a telecommunications network 1 by two access networks $AN_1$ and $AN_2$. These networks may be of the Wi-Fi, 802.11 or GERAN/UTRAN type, for example. Note, however, that the invention is not limited to the situation of two networks, but applies regardless of the number of access networks to which the user is connected.

It is assumed that the user of this user terminal $UE_A$ has a subscription with the carrier of the network 1 and has obtained an address of record $AOR_A$ that they used to register with the network 1. Such an address may be of the type alice@orange.com, for example.

Note that the invention is not limited to the situation of only one terminal, but applies also to the situation where the user has registered with the network 1 via a plurality of terminals using the same address of record $AOR_A$.

To register with the network 1 via the access network $AN_1$, in the manner known in the art the user terminal $UE_A$ sends a registration request REG including the address of record $AOR_A$ of the user, an access network type $AT_1$ representing the access network $AN_1$ used, and an address of contact $AOC_1$ at which it may be contacted via the access network $AN_1$, as specified in the IETF document RFC 3261 defining the SIP signaling protocol. The access network type is advantageously indicated in a field P-Access-Network-Info (PANI) of the request REG, as specified in the 3GPP document TS24.229. Such a request is handled by a network entity PA 100 implementing a registration or Registrar function. In a network using an SIP signaling protocol, this entity is a SIP proxy server. In a network with an IMS-type architecture this entity is an Serving Call Session Control Function (S-CSCF) server. The Registrar function in particular allows the address of record $AOR_A$ of the user to be associated with the address of contact $AOC_1$ at which it may be contacted via the access network $AN_1$. An example of a request REG including a Wi-Fi or 802.11 access network type indication in the PANI field is given below:

```
REGISTER sip:orange.com SIP/2.0
From: Alice <sip:alice@orange.com>;tag=7abfadfb6
To: Alice <sip:alice@orange.com>
Contact: <sip:bob@2a01:c001::c0a8:0121:5060>
P-Access-Network-Info: IEEE-802.11
```

According to an embodiment of the invention, the associations that are stored by the user terminal management method may take the following form:

| AOR | access | Contact address |
|---|---|---|
| sip:alice@orange.com | 3GPP-UTRAN-FDD | sip:alice@192.168.1.33:5060 |
| sip:alice@orange.com | IEEE-802.11 | sip:alice@2a01:c001::c0a8:0121:5060 |

The user terminal $UE_A$ receives an acknowledgement message in response to its request.

The user terminal proceeds in a similar fashion to register with the network via the access network $AN_2$ using the address of contact $AOC_2$.

Alternatively, the terminal $UE_A$ may be registered in one step using the two addresses of contact $AOC_1$, $AOC_2$ and the two access network types $AT_1$, $AT_2$ The PANI field then generally includes the access network type representing the access network through which the registration request REG has passed in transit, for example the access network $AT_1$. The terminal may advantageously indicate the access network types corresponding to each address of contact in a "Contact" header field, as in the example below:

```
REGISTER sip:orange.com SIP/2.0
From: Alice <sip:Alice@orange.com>;tag=7abfadfb6
To: Alice <sip:bob@orange.com>
Contact: <sip:Alice@2a01:c001::c0a8:0121:5060>;access=IEEE-802.11
Contact: <sip:Alice@192.168.1.33:5060>;access=3GPP-UTRAN-FDD
```

Consider the user terminal $UE_B$ 11 of a user Bob who has an address of record $AOR_B$ such as Bob@atlanta.com, for example. The terminal $UE_B$ is connected to the network 1 via an access network $AN_3$. Once registered with the network 1, to set up a communications session with another user terminal, for example the terminal $UE_A$ 10, the terminal $UE_B$ 11 sends a session set-up request INV to the network via the access network $AN_3$. This may be an SIP INVITE request, for example.

As in the prior art, such a request includes an address of record $AOR_A$ of the called user. It is received by the proxy server PB, which forwards it to the proxy server PA responsible for the user registered at the address $AOR_A$. If required, the proxy server PA may invoke an application server (AS) 200 responsible for executing the service requested in the session set-up request.

Figure 2:
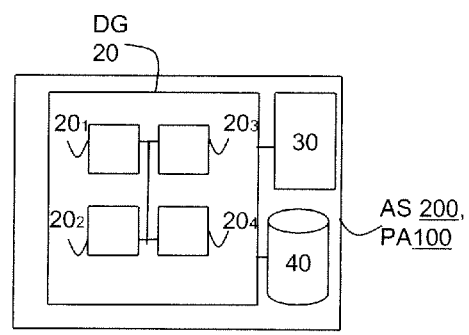
FIG. 2 is a diagram showing the structure of a user terminal management device of the telecommunications network implementing an embodiment of the invention.

According to an embodiment of the invention, the telecommunications network 1 includes a user terminal management device. Referring to FIG. 2, such a device DG 20 may be hosted in the proxy server PA 100 or in the application server AS 200. The user terminal management device DG 20 of an embodiment of the invention includes hardware elements conventionally found in a conventional computer or in an equipment of the telecommunications network 1, namely a processor $20_1$, a random-access memory (RAM) $20_2$, a read-only memory (ROM) $20_3$, and telecommunications means $20_4$ for communicating with the network 1. The telecommunications means $20_4$ thus constitute interface means with communications means of the proxy server PA 100 or the application server AS 200, such as the communications means 30.

Alternatively, the management device DG 20 may also be external to these equipments, but if the device is external to the user terminal 11, the telecommunications means are connected directly to the telecommunications network 1.

The device DG 20 is connected to an SIP Location service database 40 in which it stores the associations in the manner called for by an embodiment of the invention. This database may be internal or external to the device DG 20 or the equipment PA 100, AS 200 hosting the device DG 20.

Figure 3:
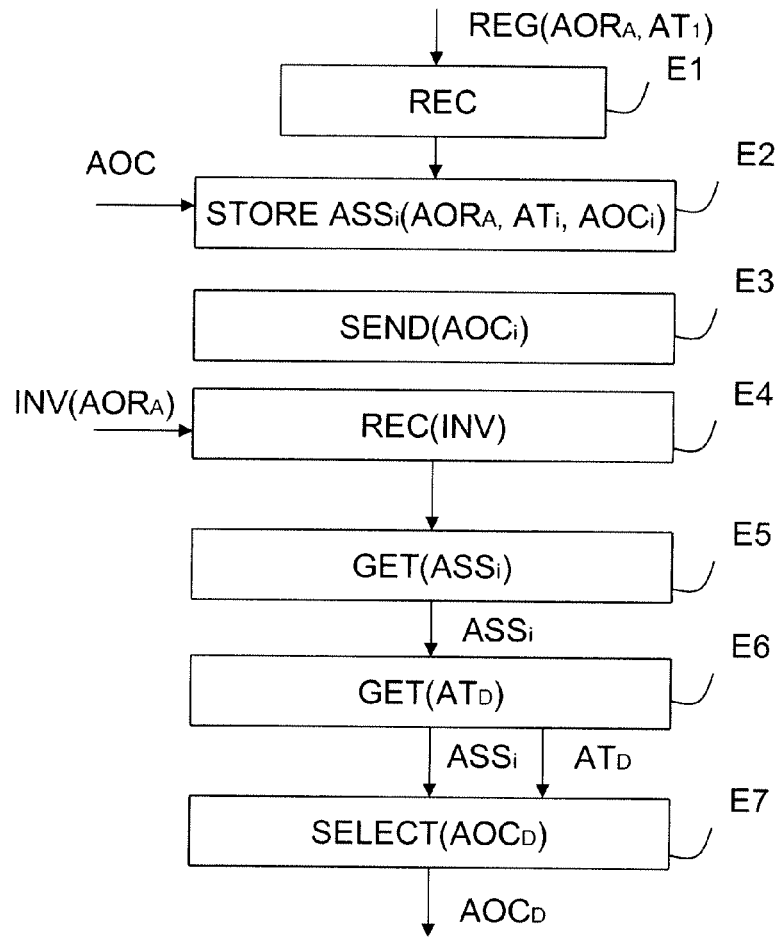
FIG. 3 shows the steps of a method of managing a user terminal of the telecommunications network, according to an embodiment of the invention.

The read-only memory $20_3$ constitutes a storage medium of an embodiment of the invention. This medium stores the computer program of an embodiment of the invention. That program includes instructions for executing the steps of the method of managing a user terminal described below with reference to FIG. 3, according to an embodiment of the invention.

In a step E1 of the user terminal management method of an embodiment of the invention the registration request REG is received from the user terminal $UE_A$ via the access network $AN_1$. It includes an address of contact $AOC_1$, an access network type $AT_1$ representing the access network $AN_1$, and the address of record $AOR_A$ of the user.

In a step E2 of the user terminal management method of an embodiment of the invention, an association $ASS_T$ including the address of record $AOR_A$, the access network type $AT_1$, and the address of contact $AOC_1$ is stored, for example in the SIP Location service database 40. In a step E3, a response message is sent to the terminal.

In a step E4 a session set-up request INV to be sent to the address of record $AOR_A$ is received from a user terminal $UE_B$ 11.

In a step E5 of the method of an embodiment of the invention, the associations $ASS_i$ where i is an integer greater than or equal to 1, stored in the database for the address of record $AOR_A$ are obtained.

In a step E6 an access network type $AT_D$ representing an access network via which to route the session set-up request to the terminal $UE_A$ of the called user is obtained.

In a step E7 an address of contact $AOC_j$ is selected from those of the stored associations as a function of the requested access network type $AT_D$.

Thus, according to an embodiment of the invention, the proxy server PA 100 responsible for routing the session set-up request INV to terminal $UE_A$ obtains an address of contact $AOC_D$ in the access network to which to route the request INV as a function of the requested access network type. If the called user is registered with the network via only one terminal $UE_A$ connected to the requested access network, the proxy server PA 100 obtains a single address of contact and therefore has no need to trigger forking to contact the requested address of record $AOR_A$.

In contrast, if the user has a plurality of terminals registered with the network 1 for the requested access network type, the proxy server PA 100 obtains only the addresses of contact associated with that access network type. It therefore uses only limited forking. Forking may advantageously be completely avoided by combining an embodiment of the invention with mechanisms for identifying the called user terminal known in the art and described in more detail below.

In a first implementation of the invention, the requested access network type $AT_D$ is obtained from the session set-up request. In other words, the request INV includes a field indicating the access network type $AT_D$.

The access network type $AT_D$ may be inserted into the request by a device DI 50 hosted in an equipment or user agent able to send and receive SIP signaling messages, for example. Such a user agent may be the calling user terminal $UE_B$ or the application server AS 200 responsible for executing the requested service.

Figure 4:
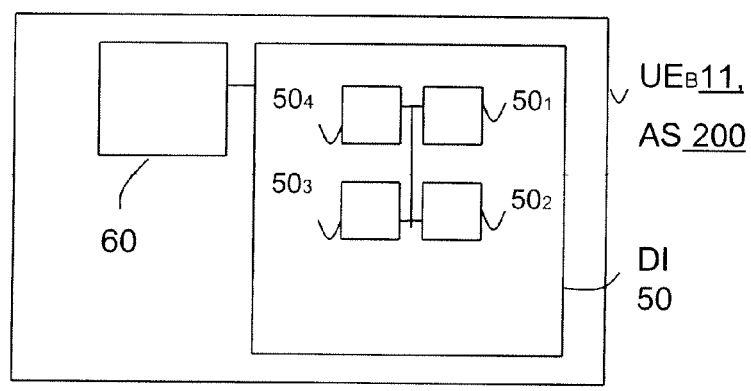
FIG. 4 is a diagram showing the structure of a device used by an equipment of the invention to send a session set-up request.

Referring to FIG. 4, the user terminal management device DI 50 of an embodiment of the invention includes hardware elements conventionally found in a conventional computer or telecommunications network equipment 1, namely a processor $50_1$, a random-access memory (RAM) $50_2$, a read-only memory (ROM) $50_3$, and telecommunications means $50_4$ for communicating with the network 1. In the FIG. 4 example, the device DI of an embodiment of the invention is in the terminal 11 or the application server AS 200. The telecommunications means $50_4$ are therefore interface means including communications means of the terminal $UE_B$ 11 or the application server AS 200, such as the communications means 60. However, the device DI 50 may alternatively be external to those equipments. Such communications means are then directly connected to the telecommunications network 1.

Figure 5:
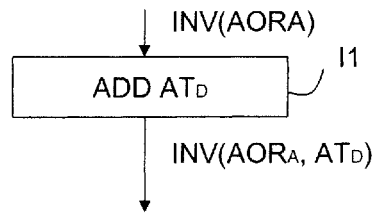
FIG. 5 shows the steps of a method of the invention of sending a session set-up request.

The read-only memory $50_3$ constitutes a storage medium of an embodiment of the invention. This medium stores the computer program of an embodiment of the invention. This program includes instructions for executing the steps of the method of sending a session set-up request described below with reference to FIG. 5, according to an embodiment of the invention.

The method includes a step I1 of inserting the access network type $AT_D$ into the session set-up request INV sent to the address of record $AOR_A$.

In a first variant, the access network type $AT_D$ may be inserted into a new "Access" field of the REQUEST URI (Uniform Resource Identifier) address of the request INV. For example, according to an embodiment of the invention the request INV may take the following form:

. for access network type AT1:
INVITE sip:orange.com;access=IEEE-802.11 SIP/2.0
From: Bob <sip:bob@atlanta.com>;tag=7abfadfb6
To: Alice <sip:Alice@orange.com>
Contact: <sip:bob@10.21.108.21:5060>
. for access network type AT2:
INVITE sip:orange.com;access=3GPP-UTRAN-FDD SIP/2.0

```
From: Bob <sip:Bob@atlanta.com>;tag=7abfadfb6
To: Alice <sip:Alice@orange.com>
Contact: <sip:Bob@10.21.108.21:5060>
```

This first variant is advantageously implemented by the calling user terminal $UE_B$. It is assumed that it obtained the access network type or types available for the called user terminal during preceding exchanges of signaling.

In a second variant, the access network type $AT_D$ is inserted into the request INV by setting the value of a particular field of a new specific identifier of the user terminal $UE_B$. Such an identifier may be, for example, an extension of a Universally Unique Identifier Uniform Resource Name (UUID URN) that uniquely identifies the user terminal $UE_B$ and remains unchanged, even if the terminal is rebooted. To be more precise, this new type of UUID URN identifier (sub-UUID URN) allows a sub-set of an entity, for example a user terminal, with which a UUID URN has been associated in a manner known in the art to be identified. Such a sub-set may be distinguished according to a particular criterion. According to an embodiment of the invention, that criterion is an access criterion and the sub-UUID identifier concerned uniquely identifies a pair comprising a user terminal and an access network type.

For example, the following sub-UUID identifier may be inserted into a session set-up request INV as called for by an embodiment of the invention: urn:sub-uuid:f81d4fae-7dec-11d0-a765-0a0c91e6bf6:access:IEEE-802.11

In a third variant, the requested access network type $AT_D$ may be inserted in the request INV by setting the value of a Globally Routable UA URI (GRUU) of the user terminal as specified in the IETF specification draf-ietf-sip-gruu (URI standing for Uniform Resource Identifier). Such an identifier uniquely identifies an association between an AOR and a user terminal or more generally a user agent. The user terminal obtains a GRUU during its registration with the telecommunications network provided that the registration request specifies that the terminal requires to receive this identifier in return by adding the sequence "+sip.instance.com" to the "Contact" header of the registration request REG. There are two types of GRUU:
  a temporary identifier temp-gruu, the validity time of which is limited; a new identifier temp-gruu is provided each time the record is refreshed; and
  a public identifier pub-gruu, which remains valid throughout the registration period.

The user terminal is then able to use this GRUU in its signaling messages to other user agents. Thus if a terminal such as the terminal $UE_B$ wishes to set up a session with a particular terminal such as the terminal $UE_A$ it specifies the GRUU of that terminal in its session set-up request INV. A disadvantage of this is that if this same terminal $UE_A$ is registered with the network via a plurality of access networks $AN_1$, $AN_2$ the proxy server PA 100 will be constrained to trigger forking to the various addresses of contact of the called terminal.

In this third variant of an embodiment of the invention, the access network type is inserted in the session set-up request INV within a modified GRUU. According to an embodiment of the invention, an access-specific GRUU (AGRUU) is defined. Whether it is temporary or public, an AGRUU may either contain an indication for obtaining the access network type associated with the AOR and the user terminal or contain the access network type directly.

Two examples of AGRUU are given:

```
pub-agruu="sip:alice@orange.com;agr=urn:sub-uuid:07e2b051-8213-ee2f-589a-
ff5f36e19409:access:3GPP-UTRAN-FDD"
tempagruu="sip:tagruu.7hs==ce72deb4cfba2b453c1546496b73b4e@orange.com;agr"
```

According to an embodiment of the invention, it is assumed that the user terminal $UE_A$ has previously received these AGRUU in response to its registration request sent to the proxy server PA 100 and that it has communicated them to the terminal $UE_B$ during previous exchanges of signaling. It may further be assumed that the terminal $UE_B$ has obtained them by any other means.

The access network type $AT_D$, for example 802.11, may be obtained from the public or temporary AGRUU inserted in the REQUEST URI part of an SIP INVITE request.

Consider by way of example the following SIP session set-up request:

```
INVITE sip:alice@example.com SIP/2.0
From: Bob <sip:bob@orange.com>;tag=a73kszlfl
To: Alice <sip:alice@example.com>
Contact:    <sip:alice@orange.com;agr=urn:sub-uuid:07e2b051-8213-ee2f-589a-
ff5f36e19409:access:IEEE-802.11>
```

The AGRUU is the sequence indicated in bold.

An advantage of the UUID URN and GRUU that have just been described is that if they are inserted in the session set-up request INV they also allow the proxy server to identify the user terminal $UE_B$ targeted by the calling user should the called user be registered with the network 1 via a plurality of terminals connected to the same type of access network, and thus to select the address or addresses of contact associated with that terminal.

It is therefore clear that combining an embodiment of the invention with use of the above-mentioned identifiers has the advantage of allowing selection of a unique address of contact associated with the identifier of a terminal of the called user and with an access network type and thus blocking of forking by the proxy server responsible for routing the request INV to the terminals of the called user.

Figure 6:
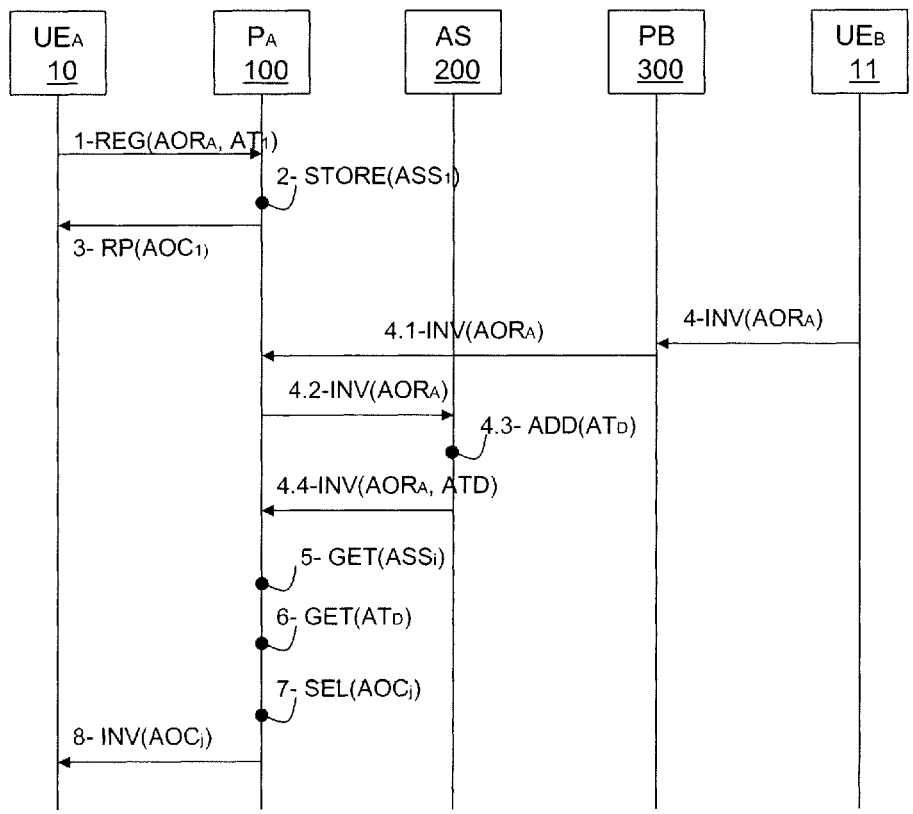
FIG. 6 is a diagram of streams exchanged between user terminals and the telecommunications network in a first implementation of the invention.

The signaling streams exchanged between the user terminals $UE_A$, $UE_B$ and the telecommunications network equipments PA 100, AS 200, and PB 300 of a first implementation of the invention are described below with reference to FIG. 6. In this first implementation, the user terminal management method of an embodiment of the invention is implemented in the proxy server PA 100.

In a first or registration phase, the terminal $UE_A$ 10 is registered with the proxy server PA 100. It is assumed that it is registered via the access networks $AN_1$ and $AN_2$ and that the database of the proxy server PA 100 consequently stores two records of associations $ASS_1$ and $ASS_2$ of an embodiment of the invention.

In a second or session set-up phase, the terminal $UE_B$ sends a session set-up request to the address of record $AOR_A$ of the user of the terminal $UE_A$. In a first variant, the terminal $UE_B$ 11 indicates an access network type $AT_D$ through which the session with the terminal $UE_A$ is to be set up. In a second variant, it is another user agent, for example the application server AS 200, that inserts this field in the request INV in one of the variants of the invention that have just been described.

The request INV including the address of record $AOR_A$ of the terminal $UE_A$ and the requested access network type $AT_D$ is sent to the proxy server PA 100.

On reception of the request INV, the management device DG 20 of the proxy server PA 100 executes the method of an embodiment of the invention and selects the address of contact $AOC_j$ corresponding to the requested access network type $AT_D$. It then routes the request to that address of contact.

Figure 7:
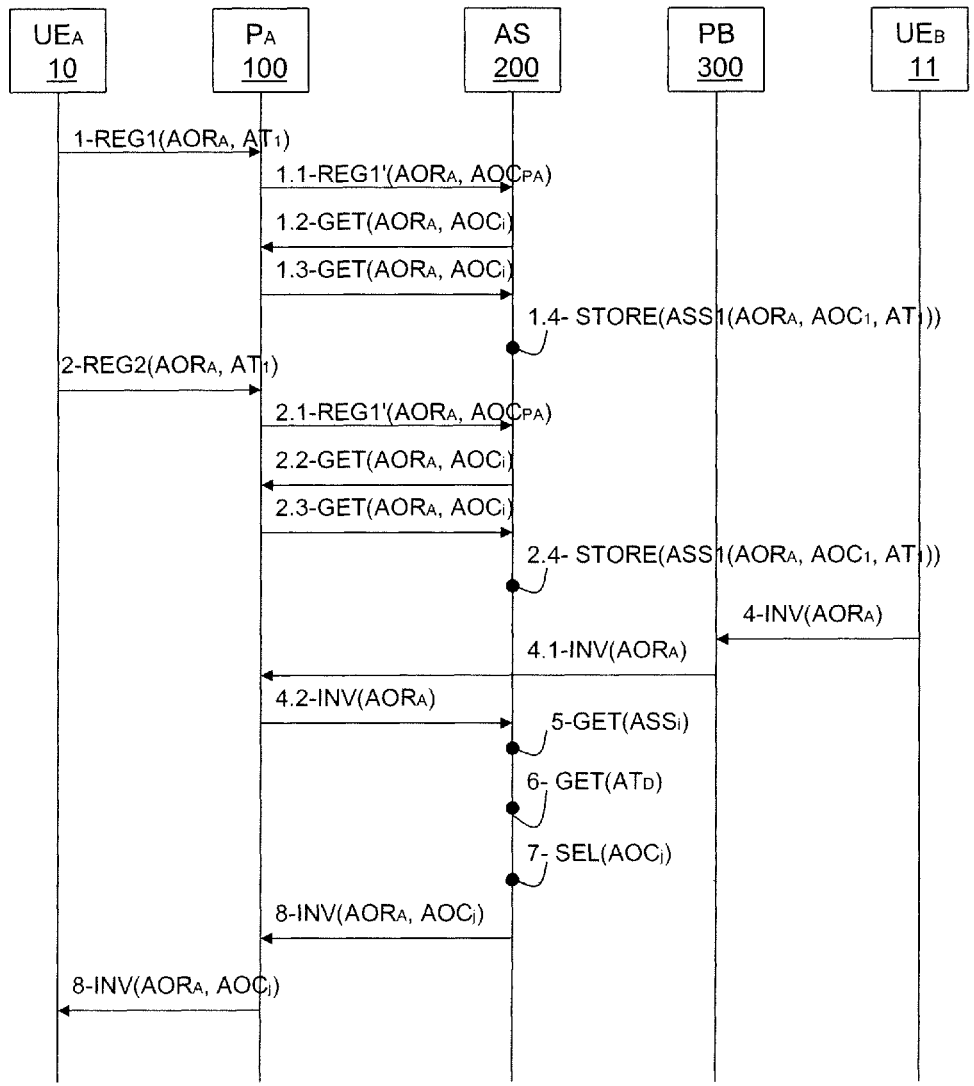
FIG. 7 is a diagram of streams exchanged between user terminals and the telecommunications network in a second implementation of the invention.

The signaling streams exchanged between the user terminals $UE_A$, $UE_B$ and the telecommunications network equipments in a second implementation of the invention are described below with reference to FIG. 7. In this second implementation, the user terminal management method of an embodiment of the invention is implemented in the application server AS 200. Thus the network 1 is one using an IMS (IP Multimedia Subsystem) architecture as described in the 3GPP document TS.24229.

In the registration phase, the terminal $UE_A$ 10 is registered with the proxy server PA 100 in a manner known in the art. It is assumed that it is registered via the access networks $AN_1$ and $AN_2$. As known in the art, the proxy server PA 100 informs the application server AS 200 of the registration request or requests $REG_1$, $REG_2$ that it has received by sending it a third-party register type message ⅓ $REG_1$, ⅓ $REG_2$, as defined in the 3GPP specification TS.24229. It is assumed below that the terminal $UE_A$ has sent two successive registration requests $REG_1$, $REG_2$ for registration with the network 1 from the access networks $AN_1$ and $AN_2$, respectively. This kind of message does not include all the information included in the source registration request or requests $REG_1$, $REG_2$. In particular, it may optionally include the type of access network by which the user terminal is connected to the network. Moreover, some of the information in the registration request may have been modified. This applies, for example, to the address of contact of the terminal $UE_A$ that the proxy server PA 100 replaces beforehand with its own address of contact $AOC_{PA}$.

In a first variant, consider the situation in which the third-party registered message includes the address of record $AOR_A$ of the user, the access network type $AT_1$ of the terminal, and the address of contact $AOC_{PA}$ of the proxy server PA 100. According to an embodiment of the invention, on reception of such a message, the application server AS 200 sends the proxy server PA 100 a listing request or listing register. The semantics of such a request are specified in IETF document RFC 3261. The application server AS 100 receives in return a list of associations between the address of record $AOR_A$ of the user and the addresses of contact in the various access network types via which the terminal of the user has been able to connect. Here, at the time of the first registration $REG_1$ of the terminal with the network $AN_1$, it obtains a list comprising the association ($AOR_A$, $AOC_1$). It is therefore able afterwards to store an association $ASS_1$ ($AOR_A$, $AOC_1$, $AT_1$) as called for by an embodiment of the invention. At the time of the second registration $REG_2$, it receives a list of associations comprising the two associations ($AOR_A$, $AOC_1$) and ($AOR_A$, $AOC_2$). Knowing the access network type $AT_2$ contained in the second registration request $REG_2$ enables it to deduce the address of contact $AOC_2$ corresponding to the access network type $AT_2$ and to constitute and then store the second association $ASS_2$ as called for by an embodiment of the invention.

It is clear that each new listing request allows updating of the associations stored by the application server AS 200, which is thus able to retain only the active associations.

The application server may advantageously reiterate its listing request regularly, every X seconds, where X is an integer greater than 0. An advantage of this is that it keeps the table of associations up to date. The number X of seconds may be chosen as a function of an average lease time of a record in the network.

In a second variant, the proxy server PA 100 inserts the address of contact of the terminal in the third-party register message.

As known in the art, in the context of an IMS architecture, the proxy server may execute filtering rules (enhanced filter criteria) contained in a profile of the user. These rules, together with the procedures implemented by the proxy server to execute them, are described in particular in 3GPP documents TS24.229 and TS24.218.

According to an embodiment of the invention, the proxy server may execute a new rule contained in a profile of the user that commands it to insert the whole of the registration request $REG_1$, $REG_2$ in the third-party register message that it sends to the application server AS 200.

The application server AS then stores the associations $ASS_1$, $ASS_2$ as called for by an embodiment of the invention, directly and without having recourse to additional exchanges of signaling with the proxy server PA 100.

In the session set-up phase, the terminal $UE_B$ sends a session set-up request to the address of record $AOR_A$ of the user of the terminal $UE_A$. It is assumed that this request may optionally include the access network type $AT_D$ requested for the called user.

The request INV is received first by the proxy server PB 300 and then forwarded to the proxy server PA 100, which invokes the application server AS 200 responsible for providing the requested service. On reception of such a request, the server AS 200 recovers the stored associations $ASS_T$, $ASS_2$ for the called user and decides on an access network type $AT_{AS}$ to which to send the request INV as a function of predetermined criteria and the access networks to which the called user is connected. For example, such criteria may take into account the resources available in the access networks, the service requested or a carrier policy.

In a first variant, the request INV includes no requested access network type $AT_D$. The application server obtains an access network type $AT_{AS}$ to be inserted in the request using the decision process of an embodiment of the invention. It then inserts it into the request INV that it sends to the proxy server PA 100 responsible for the called user.

In a second variant, the request INV includes an access network type $AT_D$ requested by the calling user. The application server AS 200 may then accept or refuse this access network type as a function of its decision criteria. For example, it may refuse the access network type requested by the terminal $UE_B$ if it is not an access network to which the terminal $UE_A$ is connected. Alternatively, it may refuse an access network type $AT_D$ even though it is available because it does not meet a criterion predetermined by the carrier, for example because it is not an access network authorized for the requested service.

If it accepts it, it forwards the request INV without modification. If it refuses it, it first replaces the value of the requested access network type $AT_D$ by that of the access network type $AT_{AS}$ on which it has decided. Once it has the access network type $AT_D$, $AT_{AS}$ to be taken into account to set up the requested session, the application server looks for the corresponding address of contact $AOC_j$ in the associations $ASS_1$, $ASS_2$ stored for the user registered at the address $AOR_A$. Once it has obtained it, it inserts it in a field of the session set-up request INV. According to an embodiment of the invention, a plurality of fields of the request INV may be used for this purpose, for example:

- using a field "maddr" of the address REQUEST URI of the session set-up request INV;
- alternatively, the address REQUEST URI may also be replaced by the address of contact $AOC_j$;
- another possibility is to create a parameter dedicated to transporting the address of contact $AOC_j$ that is added to the address REQUEST URI or to the header of the request;
- a further variant is to insert the address of contact $AOC_j$ into the "Route" header of the session set-up request INV.

According to an embodiment of the invention, on reception of the request INV modified by the application server AS 200, the proxy server PA 100 responsible for the called user is able to take the indicated address of contact $AOC_j$ into account to route the request only to that address of contact, without implementing forking in respect of all the target addresses of contact stored for the called user.

It should be noted that, if the user of the terminal $UE_A$ 10 is also registered with the network 1 from one of the access networks $AN_1$, $AN_2$ via another terminal $UE_{A'}$ (not shown), the device DG 20 of an embodiment of the invention allows forking to be limited to the addresses of contact associated with the requested access network type. To block forking completely, the method of an embodiment of the invention may advantageously be combined with use of the UUID URN or GRUU described above, which allows a target user terminal to be identified uniquely.

Although the present disclosure has been described with reference to one or more examples, workers skilled in the art will recognize that changes may be made in form and detail without departing from the scope of the disclosure and/or the appended claims.

The invention claimed is:

1. A method of managing a user terminal of a telecommunications network, said user terminal being connected to said telecommunications network by at least one access network, wherein the method comprises:
   receiving a registration request containing an address of record of the user, at least one address of contact and at least one access network type of the user terminal;
   upon reception of the registration request, executing a step of storing at least one association containing the address of record of the user, the address of contact of the user terminal and the access network type in a database; and
   on reception of a session set-up request going to said address of record of the user, executing the following steps:
      obtaining at least one stored association including said address of record, the network type, and the address of contact of the user terminal in the access network;
      obtaining from the session set-up request an access network type by which to access the user terminal, referred to as a called terminal; and
      selecting an address of contact to which to route said request in the stored associations as a function of the access network type.

2. A device for managing a user terminal in a telecommunications network connected to the telecommunications network by at least one access network, wherein the device comprises:
   a communications device, which is adapted to receive from the telecommunications network a registration request including an address of record of the user, an address of contact and an access network type of the terminal; and
   a processor, which is configured to store in a database at least one association between the address of record of the user, the access network type and the address of contact of the terminal, upon reception of the registration request, and wherein the processor is configured to, following registration of said user in the telecommunications network and on reception of a session set-up request going to the address of record of said user:
      obtain, for said address of record, at least one association between said address of record, the access network type, and the address of contact of the terminal in an access network; and
      obtain from the session set-up request an access network type by which to access the user terminal, referred to as a called terminal to choose from the stored associations an address of contact to which to route said request as a function of the access network type.

3. A proxy server in a telecommunications network, including:
   means for receiving a registration request including an address of record of a user, at least one address of contact, and at least one access network type of a terminal by which said user is connected to said telecommunications network through at least one access network,
   means for receiving a session set-up request going to the address of record of said user in the telecommunications network, and
   a device for managing said user terminal and comprising a processor, which is configured to store in a database at least one association between the address of record of the user, the access network type and the address of contact of the terminal, upon reception of the registration request, and wherein the processor is configured to, following registration of said user in the telecommunications network and on reception of the session set-up request going to the address of record of said user:
      obtain, for said address of record, at least one association between said address of record, the access network type, and the address of contact of the terminal in an access network; and
      obtain from the session set-up request an access network type by which to access the user terminal, referred to as a called terminal to choose from the stored associations an address of contact to which to route said request as a function of the access network type.

4. An application server in a telecommunications network including:
   means for receiving a registration request including an address of record of a user, at least one address of contact, and at least one access network type of a terminal by which said user is connected to said telecommunications network through at least one access network,
   means for receiving a session set-up request going to the address of record of said user in the telecommunications network, and a device for managing said user terminal and comprising a processor, which is configured to store in a database at least one association between the address of record of the user, the access network type and the address of contact of the terminal, upon reception of the registration request, and wherein the processor is configured to, following registration of said user in the telecommunications network and on reception of the session set-up request going to the address of record of said user:
  obtain, for said address of record, at least one association between said address of record, the access network type, and the address of contact of the terminal in an access network; and
  obtain from the session set-up request an access network type by which to access the user terminal, referred to as a called terminal to choose from the stored associations an address of contact to which to route said request as a function of the access network type.

5. A method implemented by a terminal of a user, referred to as a calling user, of a telecommunications network, comprising:
  sending a session set-up request in the telecommunications network to an address of record of another user, referred to as a called user, and
  inserting in the session set-up request an access network type representing an access network located between the called user and the telecommunication network and by which the called user is connected to the telecommunications network.

6. Equipment comprising:
  a terminal of a user, referred to as a calling user, connectable to a telecommunications network, and configured to exchange signaling messages with a terminal of another user, referred to as a called user, which is connected to the telecommunications network via an access network, wherein the terminal of the calling user comprises:
    a communications device configured to send a session set-up request in the telecommunications network to an address of record of the called user, and
    a processor configured to insert in the session set-up request an access network type representing the access network located between the called user and the telecommunication network and by which the terminal of the called user is connected to the telecommunications network.

7. A computer program product stored on a non-transitory computer-readable medium and executable by a microprocessor, wherein the product comprises program code instructions for executing a method of managing a user terminal of a telecommunications network, said user terminal being connected to said telecommunications network by at least one access network, wherein the method comprises:
  receiving a registration request containing an address of record of the user, at least one address of contact and at least one access network type of the user terminal;
  upon reception of the registration request, executing a step of storing at least one association containing the address of record of the user, the address of contact of the user terminal and the access network type in a database; and
  on reception of a session set-up request going to said address of record of the user, executing the following steps:
    obtaining at least one stored association including said address of record, the network type, and the address of contact of the user terminal in the access network;
    obtaining from the session set-up request an access network type by which to access the user terminal, referred to as a called terminal; and
    selecting an address of contact to which to route said request in the stored associations as a function of the access network type.

8. A computer program product stored on a non-transitory computer-readable medium and executable by a microprocessor, wherein the product comprises program code instructions for executing, in a terminal of a user, referred to as a calling user, of a telecommunications network, a method comprising:
  sending a session set-up request in the telecommunications network from the terminal of the calling user to an address of record of another user, referred to as a called user, and
  inserting in the session set-up request an access network type representing an access network located between the called user and the telecommunication network and by which the called user is connected to the telecommunications network.

9. The method according to claim 5, wherein the access network type is inserted in an identifier, which directly contains the access network type associated with the address of record and the called user terminal.

10. The method according to claim 5, wherein the access network type is inserted in an identifier, which contains an indication for obtaining the access network type associated with the address of record and the called user terminal.

11. The equipment according to claim 6, wherein the access network type is inserted in an identifier, which directly contains the access network type associated with the address of record and the called user terminal.

12. The equipment according to claim 6, wherein the access network type is inserted in an identifier, which contains an indication for obtaining the access network type associated with the address of record and the called user terminal.

* * * * *